US011681865B2

(12) United States Patent
Chan et al.

(10) Patent No.: US 11,681,865 B2
(45) Date of Patent: Jun. 20, 2023

(54) ANNOTATING A LOG BASED ON LOG DOCUMENTATION

(71) Applicant: International Business Machines Corporation, Armonk, NY (US)

(72) Inventors: Yuk Lung Chan, Rochester, NY (US); Tian Wu, Beijing (CN); Lei Yu, Sleepy Hollow, NY (US); Jia Qi Li, Beijing (CN); Hong Min, Hopewell Junction, NY (US); Fan Jing Meng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/482,531

(22) Filed: Sep. 23, 2021

(65) Prior Publication Data
US 2023/0093225 A1 Mar. 23, 2023

(51) Int. Cl.
*G06F 40/169* (2020.01)
*G06N 20/00* (2019.01)
*G06F 40/186* (2020.01)
*G06F 40/242* (2020.01)

(52) U.S. Cl.
CPC .......... *G06F 40/169* (2020.01); *G06F 40/186* (2020.01); *G06F 40/242* (2020.01); *G06N 20/00* (2019.01)

(58) Field of Classification Search
CPC .... G06F 40/169; G06F 40/186; G06F 40/242; G06N 20/00
See application file for complete search history.

(56) References Cited

U.S. PATENT DOCUMENTS

| 8,069,053 | B2 | 11/2011 | Gervais |
| 9,886,584 | B2 | 2/2018 | Ben |
| 10,579,351 | B2 | 3/2020 | Groseclose |
| 10,713,390 | B2 | 7/2020 | Anderson |
| 10,762,240 | B2 | 9/2020 | Reed |
| 11,080,294 | B1* | 8/2021 | Johnston ............... G06F 40/284 |
| 11,243,834 | B1* | 2/2022 | Mandal ............... G06F 11/3006 |
| 2006/0005017 | A1 | 1/2006 | Black |
| 2010/0229150 | A1* | 9/2010 | Stone .................. G06F 11/3684 717/124 |
| 2011/0239113 | A1 | 9/2011 | Hung |

(Continued)

OTHER PUBLICATIONS

Kobayashi et al., "Towards an NLP-based log template generation algorithm for system log analysis," ACM, Jun. 18, 2014, pp. 1-4. (Year: 2014).*

(Continued)

*Primary Examiner* — Kyle R Stork
(74) *Attorney, Agent, or Firm* — Cantor Colburn LLP; Teddi Maranzano

(57) ABSTRACT

Embodiments of the invention are directed to annotating a log based on processing log documentation. Aspects include obtaining the log having a plurality of entries. Aspects also include creating a set of log entry templates by processing the log documentation associated with the log, wherein each log entry template includes one or more constants and one or more variables. Aspects further include annotating each of the plurality of entries based on the set of templates, wherein the annotating includes labeling each value of the one or more variables with a variable name.

17 Claims, 9 Drawing Sheets

400

Obtain log documentation for a corresponding log
402

Create a set of log entry templates by performing natural language processing and dictionary lookup to identify one or more constants and one or more variables that define each log entry template of the set of log entry templates
404

(56) References Cited

U.S. PATENT DOCUMENTS

| | | | |
|---|---|---|---|
| 2012/0233671 | A1 | 9/2012 | Beder |
| 2014/0282373 | A1 | 9/2014 | Garza |
| 2016/0102881 | A1* | 4/2016 | Kim .................... G05B 19/042 |
| | | | 165/218 |
| 2017/0075932 | A1* | 3/2017 | Wang ...................... G06F 16/22 |
| 2018/0329883 | A1* | 11/2018 | Leidner ................ G06N 3/0454 |
| 2019/0130009 | A1* | 5/2019 | McLean .............. G06F 16/2365 |
| 2019/0286716 | A1* | 9/2019 | Lin ....................... G06F 40/216 |
| 2019/0311022 | A1 | 10/2019 | Fan et al. |
| 2019/0392176 | A1 | 12/2019 | Taron |
| 2020/0192785 | A1 | 6/2020 | Chen |
| 2021/0037032 | A1 | 2/2021 | Soeder et al. |
| 2022/0091916 | A1* | 3/2022 | Liu ..................... G06F 11/0778 |

OTHER PUBLICATIONS

Chen et al., "Code summarization with abstract syntax tree." International Conference on Neural Information Processing. Springer, Cham, 2019, 8 pages.

Farrugia et al. "Improved breast cancer care quality metrics after implementation of a standardized tumor board documentation template." Journal of oncology practice 11.5 (2015): 421-423.

Grace Period Disclosure. Lei et al. "ICSE Demo Documentation based Semantic-Aware Log Parsing.", https://www.youtube.com/watch?v=_h-EujDXIqU. Nov. 21, 2020. 12 Pages.

Leander et al. "Design and Implementation of a Novel Electronic Health Record Tool to Enhance the Care of Individuals with Cystic Fibrosis: The Cystic Fibrosis Note Template." ACI Open 3.01 (2019): e26-e36.

List of IBM Patents or Patent Applications Treated as Related; Date Filed: Sep. 23, 2021, 2 pages.

Liu et al., "Log System Based on Software Testing System Design And Implementation." 2015 4th International Conference on Mechatronics, Materials, Chemistry and Computer Engineering. Atlantis Press, 2015; 7 pages.

Yuk Lung Chan et al., "Removing Data Having a Data Type From a Data Set", U.S. Appl. No. 17/482,533, filed Sep. 23, 2021.

Zhang et al. "A novel neural sougrce code representation based on abstract syntax tree." 2019 IEEE/ACM 41st International Conference on Software Engineering (ICSE). IEEE, 2019; 12 pages.

\* cited by examiner

ANNOTATING A LOG BASED ON LOG DOCUMENTATION

The named inventors of the present application posted a video on YouTube, at https://www.youtube.com/watch?v=_h-EujDXlqU, describing portions of the material disclosed on Nov. 21, 2020. Neither the video nor the slides presented therein were published prior to Nov. 21, 2020. Screenshots of the slides presented in the video are submitted herewith, cited in the accompanying Information Disclosure Statement, and expressly incorporated herein by reference in their entirety for all purposes.

BACKGROUND

The present invention generally relates to log parsing and template mining, and more specifically, to annotating a log based on template mining of log documentation.

In modern computer systems, log messages are a primary source for system diagnosis and status checking. In general, log messages are in the form of unstructured text data and include dynamic contents, which can vary between systems, workloads, and time periods. Recently, attempts have been made to mine templates of various log messages by performing analytics on the log messages. However, given the unstructured and dynamic nature of the log messages, templates mining based on log messages have not been effective.

SUMMARY

Embodiments of the present invention are directed to a computer-implemented method for annotating a log based on processing log documentation. A non-limiting example of the computer-implemented method includes obtaining the log having a plurality of entries. The method also includes creating a set of log entry templates by processing the log documentation associated with the log, wherein each log entry template includes one or more constants and one or more variables. The method further includes annotating each of the plurality of entries based on the set of templates, wherein the annotating includes labeling each value of the one or more variables with a variable name.

Embodiments of the present invention are directed to a system for annotating a log based on processing log documentation. A non-limiting example of the system includes a processor communicative coupled to a memory, the processor operable to obtain the log having a plurality of entries. The processor is also operable to create a set of log entry templates by processing the log documentation associated with the log, wherein each log entry template includes one or more constants and one or more variables. The processor is also operable to annotate each of the plurality of entries based on the set of templates, wherein the annotating includes labeling each value of the one or more variables with a variable name.

Embodiments of the invention are directed to a computer program product for annotating a log based on processing log documentation, the computer program product comprising a computer readable storage medium having program instructions embodied therewith. The program instructions are executable by a processor to cause the processor to perform a method. A non-limiting example of the method includes obtaining the log having a plurality of entries. The method also includes creating a set of log entry templates by processing the log documentation associated with the log, wherein each log entry template includes one or more constants and one or more variables. The method further includes annotating each of the plurality of entries based on the set of templates, wherein the annotating includes labeling each value of the one or more variables with a variable name.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
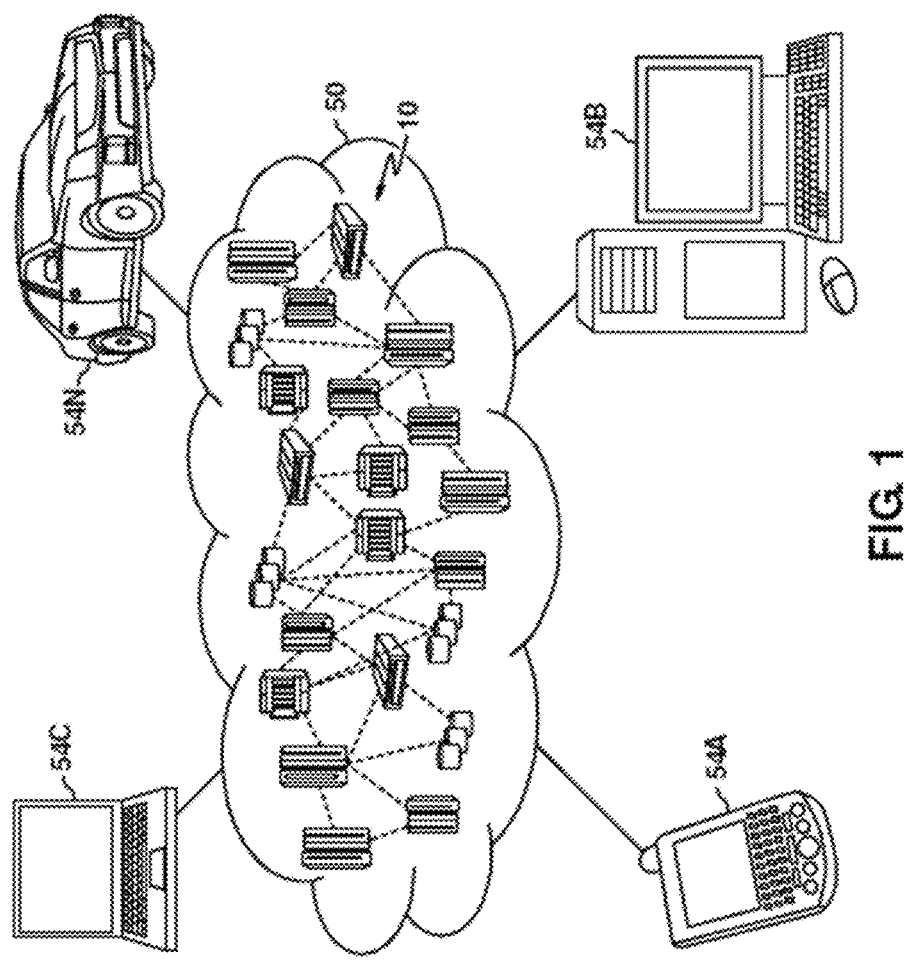
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, attempts have recently been made to mine templates of various log messages by performing analytics on the log messages. However, given the unstructured and dynamic nature of the log messages, templates mining based on log messages has not been effective. Disclosed herein are methods, systems, and computer program products for mining templates for use in annotating a computing log that utilizes processing of log documentation to create log templates. It is often the case that the computing equipment, software, and/or hardware that creates log messages has an associated set of documentation that includes an explanation of the structure and content of the log messages created by the computing equipment. In exemplary embodiments, this documentation, referred to herein as log documentation, is processed to create a set of log templates that are used to annotate log messages in the log.

As used herein a log template is an abstraction of a print statement in a log that includes a set of constant keywords (tokens without the < >) and parameters (tokens surrounded by < >). One example of a log template is: ARC0161I MIGRATION PREPROCESSING VOLUME <P>, SGROUP=<P> FOR USER <P>, REQUEST <P>. Actual log entries are represented by the templates whose parameter is replaced with actual values generated during software executions. In exemplary embodiments, log templates carry different parameter values for different instances of executions, but the same transition between templates represents the same transition of control flow in every execution. In exemplary embodiments, log templates are used to construct the control flow graph from execution logs, build a log sequence/graph model to learn the patterns of system workflows for problem diagnostic and anomaly detections.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
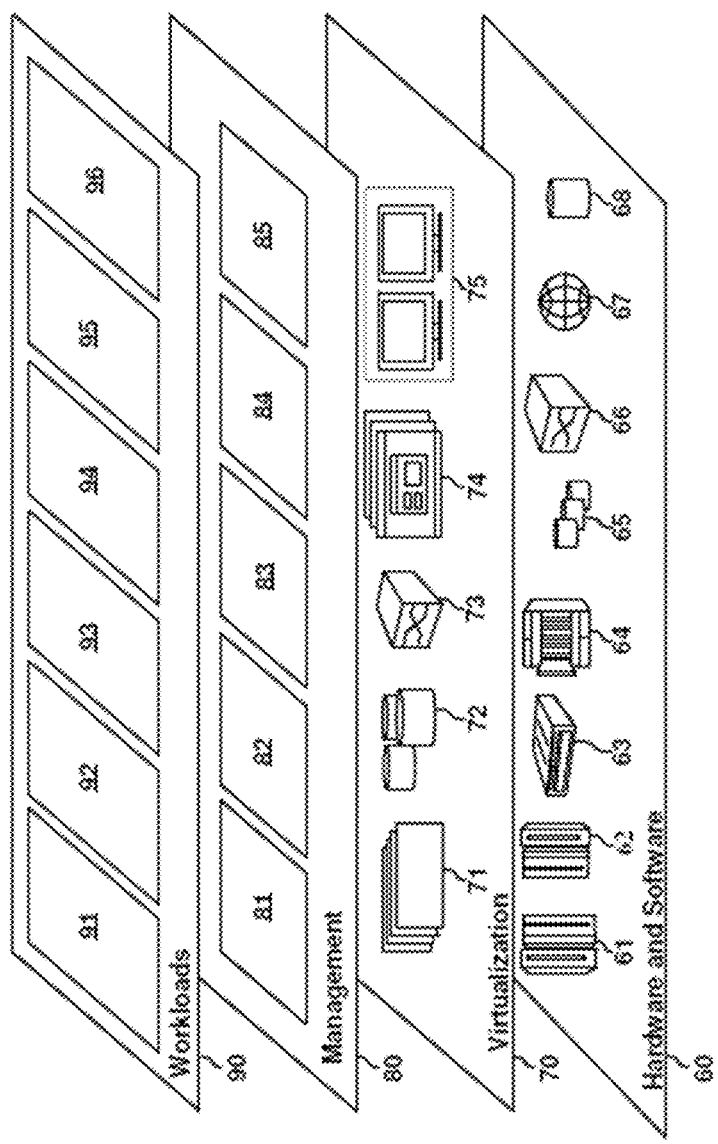
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and annotating a log based on processing log documentation 96.

Figure 3:
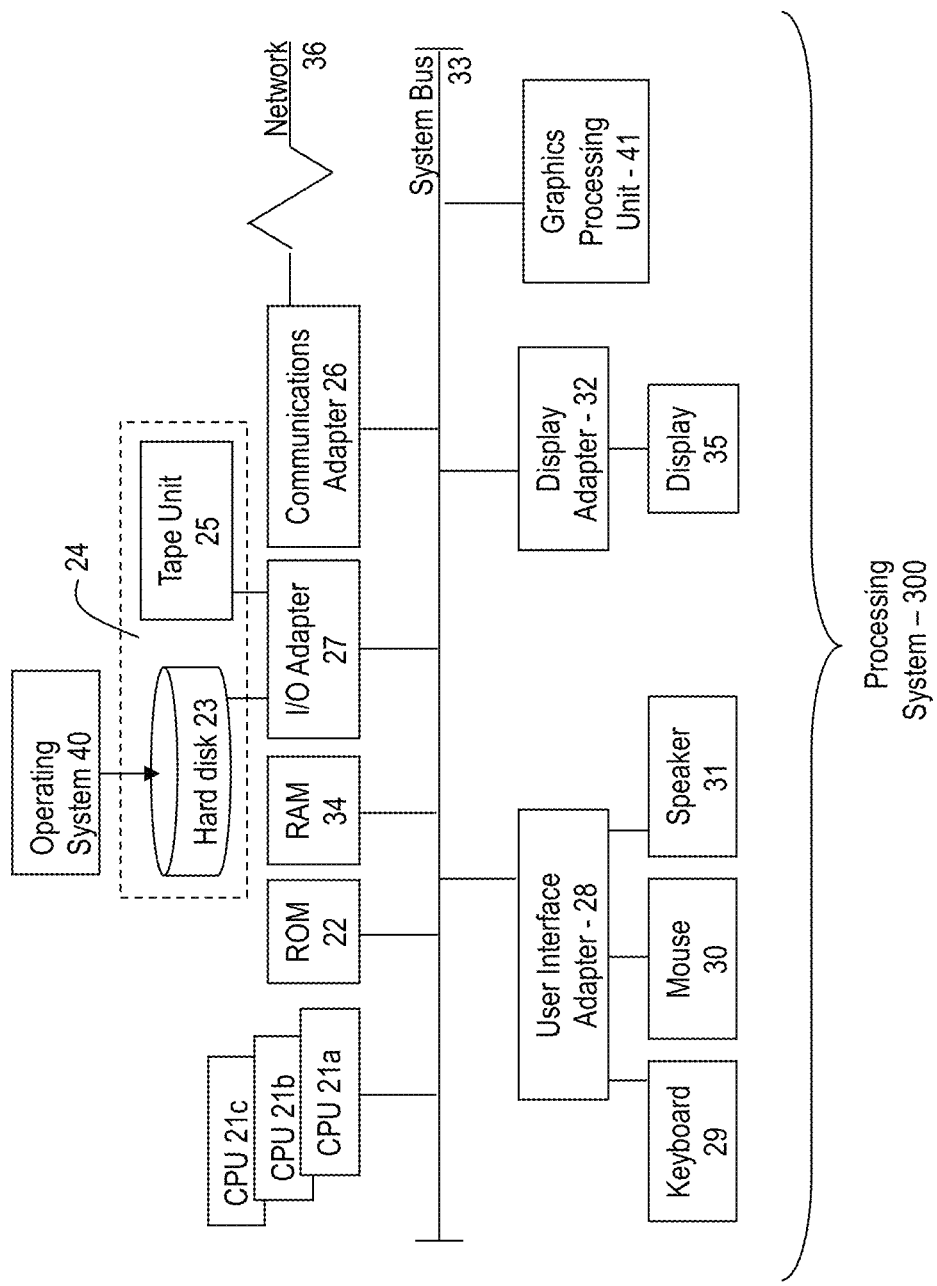
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 3.

Turning now to a more detailed description of aspects of the present invention, methods, systems, and computer program products for annotating a log based on processing log documentation are provided. In exemplary embodiments, a set of log templates are created by processing log documentation, which is documentation associated with the equipment/software that creates the log messages. In addition, the set of log templates are used to analyze and annotate a log. In one embodiment, the annotated log is used for anomaly detection. In another embodiment, the annotated log is processed to identify and remove sensitive data from the log, such as personally identifiable information that is governed by General Data Protection Regulations (GDPR).

Figure 4:
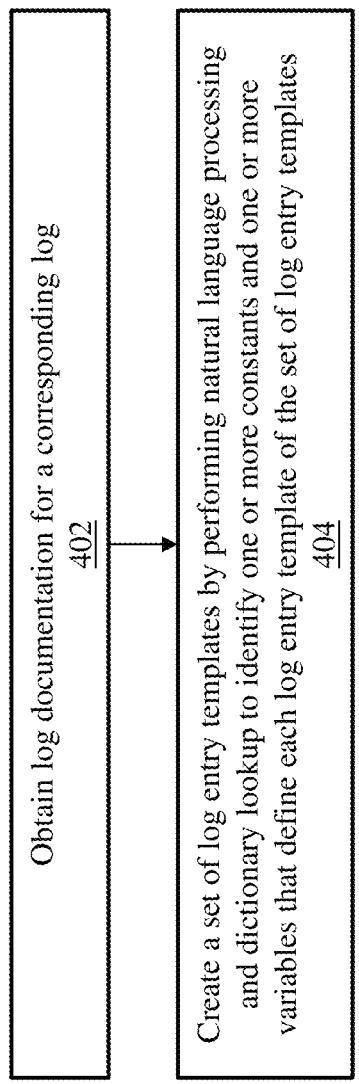
FIG. 4 depicts a flow diagram of a method for creating log entry templates based on log documentation according to one or more embodiments of the invention.

Referring now to FIG. 4 a flow diagram of a method 400 for creating log entry templates based on log documentation according to one or more embodiments of the invention is shown. As illustrated, the method 400 includes log documentation for a corresponding log, as shown at block 402. In exemplary embodiments, the log documentation is documentation that is associated with the equipment/software that creates the log messages. Next, as shown at block 404, the method 400 includes creating a set of log entry templates by performing natural language processing and dictionary lookup to identify one or more constants and one or more variables that define each log entry template of the set of log entry templates. In exemplary embodiments, a log template is a syntax of a log message. The log template includes one or more parameters, which are one of constants and variables. The log templates are created based on performing natural language processing, dictionary lookup, or other machine learning techniques to the log documentation.

In exemplary embodiments, the log templates are created by constructing a syntax tree from the product documentation. In one embodiment, the syntax tree includes nodes that have different types. The node types include a constant node, which is used to represent a constant keyword, which is a keyword that always appears in a log message. The node types include a variable node, which is used to represent a variable that appears in a log message. The node types also include an optional node, which is used to represent a portion of a message that may appear or may not appear in the log message. The node types include a choice node, which is used to represent a part of the log message that must be selected from a provided list of different representations. The node types include further includes a composite node, which is used to represent a sequence of different node types and/or other composite nodes.

Figures 5A, 5B:
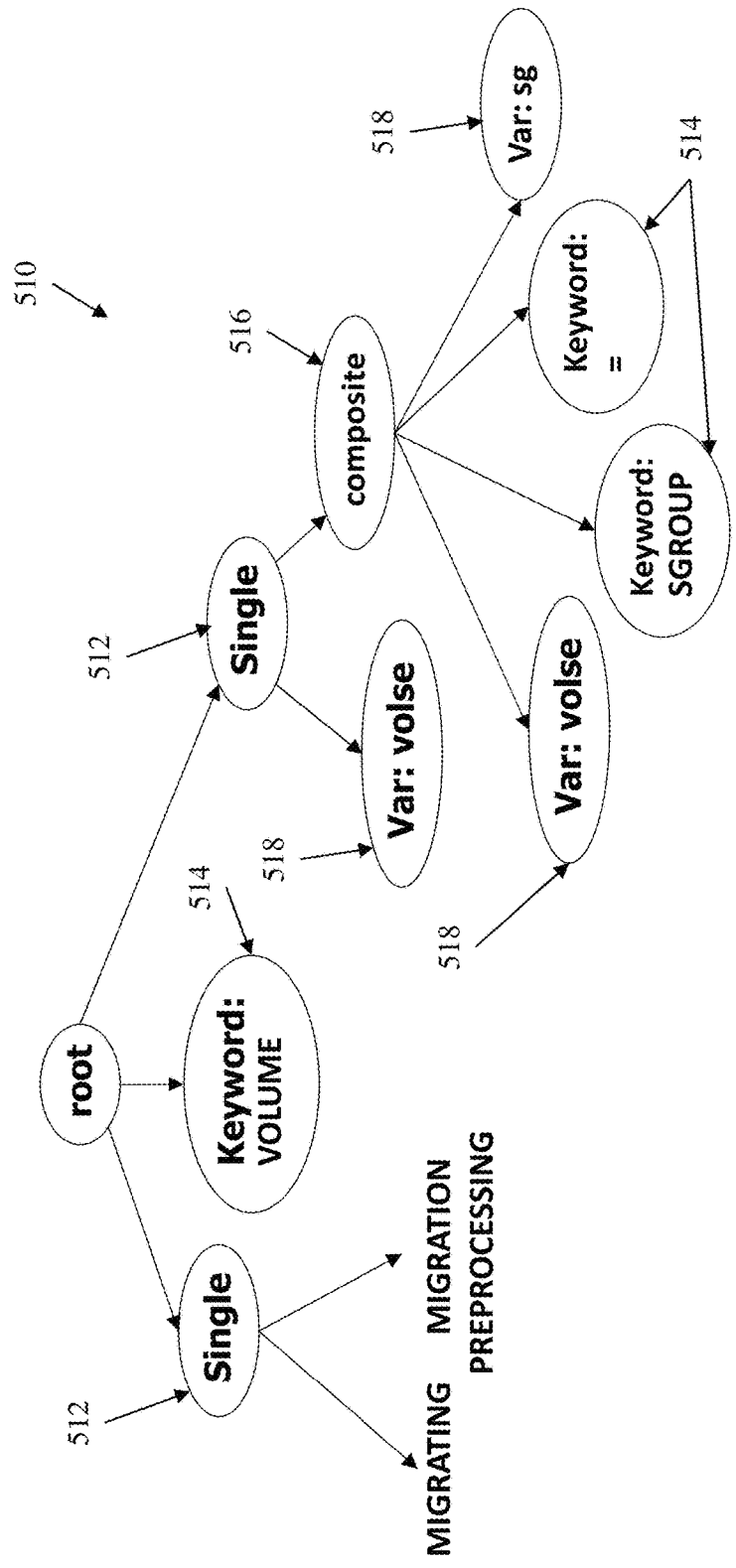
FIG. 5A depicts a log template according to embodiments of the invention.
FIG. 5B depicts a syntax tree used to create a log template according to one or more embodiments of the invention.

Referring now to FIGS. 5A and 5B, a syntax tree 510 that is used to create the log template 500 are shown. As illustrated, the syntax tree 510 includes single nodes 512, keyword nodes 514, composite nodes 516, and variable nodes 518. In exemplary embodiments, one or more machine learning techniques are applied to a log documentation to create the syntax tree 510, which in turn is used to create the log template 500. In the process of syntax tree based log parsing, a log message is matched with its corresponding syntax tree, using depth-first tree search. The matching process identifies the tokens in log messages that correspond to variables in its template, by which the method can annotate these tokens with variable names in the template, and also build value lookup dictionary that can map values to their variable names.

Figure 8:
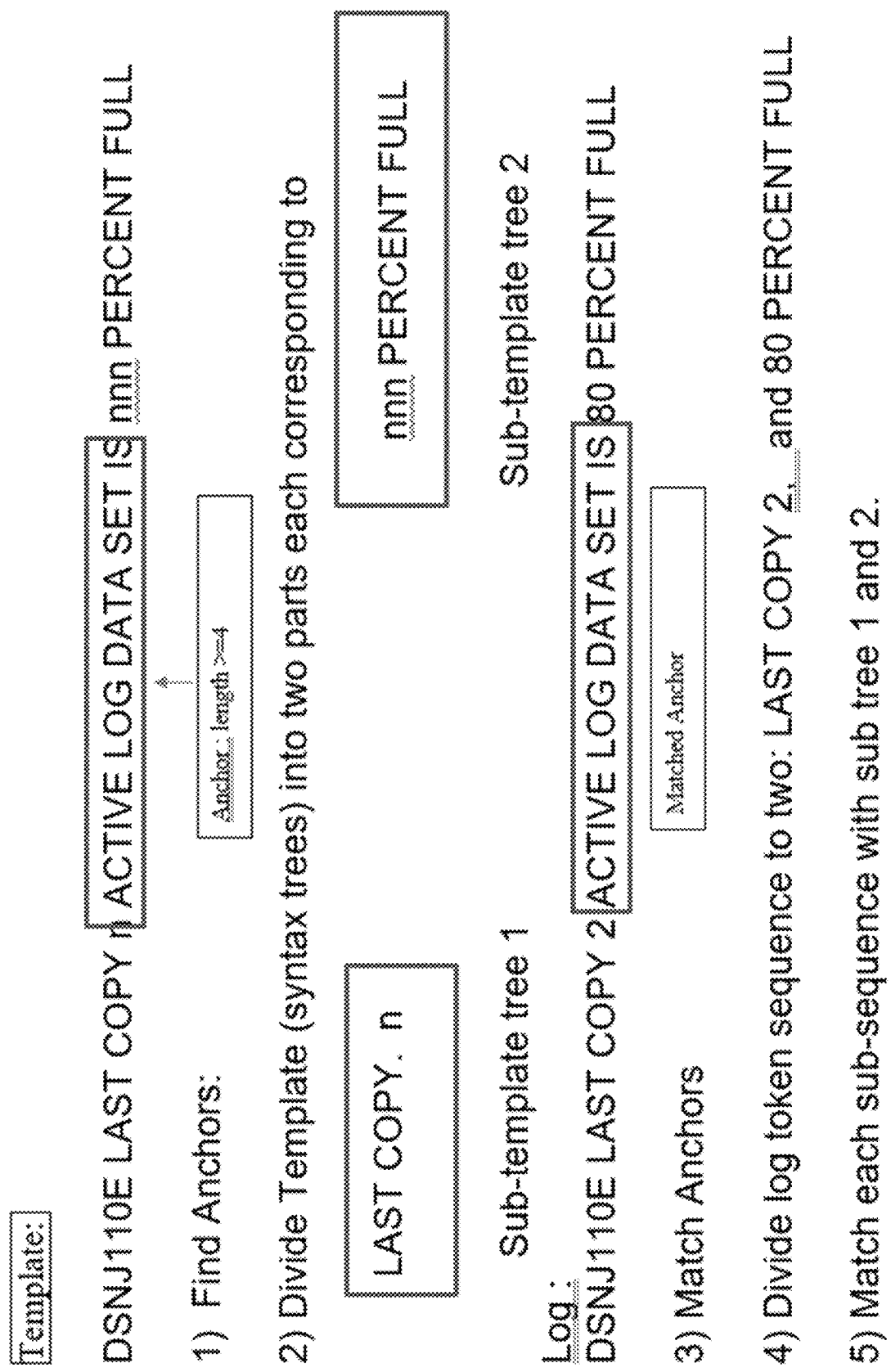
FIG. 8 depicts an anchor based divided-and-conquer tree matching algorithm according to one or more embodiments of the invention.

Referring to FIG. 8, to improve matching efficiency, the method includes an anchor based divided-and-conquer tree matching algorithm. An anchor is a sequence of consecutive constant keywords in a log message, with length larger than a given threshold. After identifying all anchors, the method divides the syntax tree into a set of subtrees each corresponding the templates in intervals between these anchors. The log message is divided at these anchors, and the tokens in between the anchors is matched with each corresponding subtree. The tree matching is done with depth first search.

Figure 6:
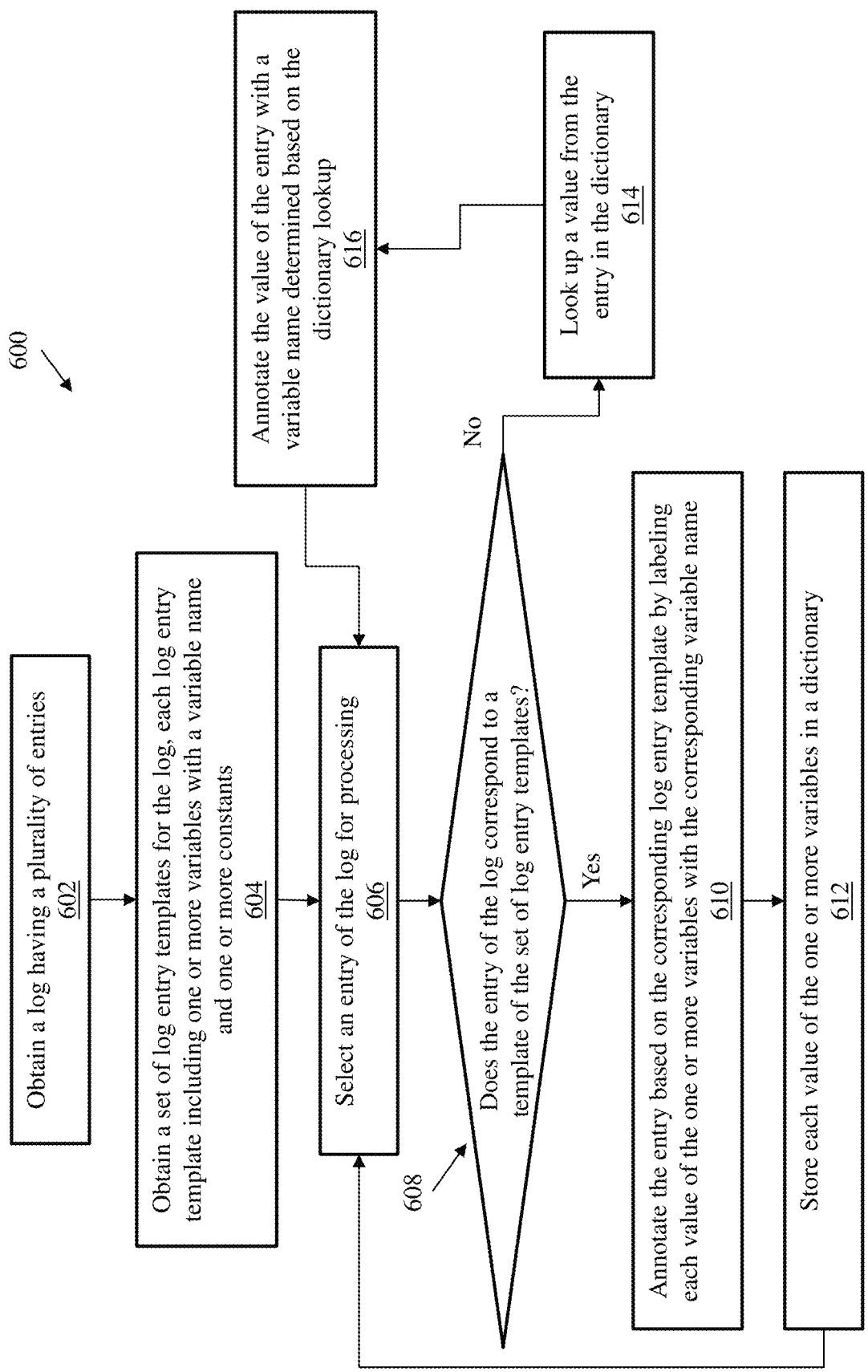
FIG. 6 depicts a flow diagram of a method for annotating a log based on processing log documentation according to one or more embodiments of the invention.

Referring now to FIG. 6, a flow diagram of a method 600 for annotating a log based on processing log documentation according to one or more embodiments of the invention is shown. As shown at block 602, the method 600 includes obtaining a log having a plurality of entries. Next, as shown at block 604, the method 600 includes obtaining a set of log entry templates for the log, each log entry template including one or more variables with a variable name and one or more constants. The method 600 also includes selecting an entry of the log for processing, as shown at block 606. Next, as shown at decision block 608, the method 600 includes determining whether the entry of the log corresponds to a template of the set of log entry templates. In exemplary embodiments, the text of the log is compared to each of the set of templates to identify a match between one of the templates and the entry based on the content and structure of the text in the entry.

Based on a determination that the entry of the log corresponds to a template of the set of log entry templates, the method 600 proceeds to block 610 and includes annotating the entry based on the corresponding log entry template by labeling each value of the one or more variables with the corresponding variable name from the log template. Next, the method proceeds to block 612 and stores each value of the one or more variables in a dictionary. In exemplary embodiments, the dictionary is used to store all values of each variable that are encountered during the processing of a log along with the variable names. The dictionary provides a mapping between values and variable names. Once a value of a variable has been added to the log, each time it is encountered again, a counter associated with the variable name for that value is incremented by one.

Based on a determination that the entry of the log does not correspond to a template of the set of log entry templates, the method 600 proceeds to block 614 and includes looking up a value from the entry in the dictionary. In exemplary embodiments, looking up a value from the entry in the dictionary includes identifying a variable name associated with the value. In cases where more than one variable name is associated with the value, the variable name that has the highest counter is returned. Next, as shown at block 616, the method 600 includes annotating the value of the entry with a variable name determined based on the dictionary lookup.

In exemplary embodiments, the method 600 can either run as one single workflow or be further divided to run in stages. For the staged manner, in the first stage, the method runs only on a set of logs that have corresponding templates from documents to create an initial value-variable name dictionary, which only includes block 606, 608, 610 and 612, without block 614, 616 in the second stage, the whole method runs as a whole to take new incoming logs, which includes block 614 and 616. Because the value-variable name dictionary has already been created with values seen in logs of the early stage, the second stage can effectively identify values seen before from incoming logs.

Figure 7:
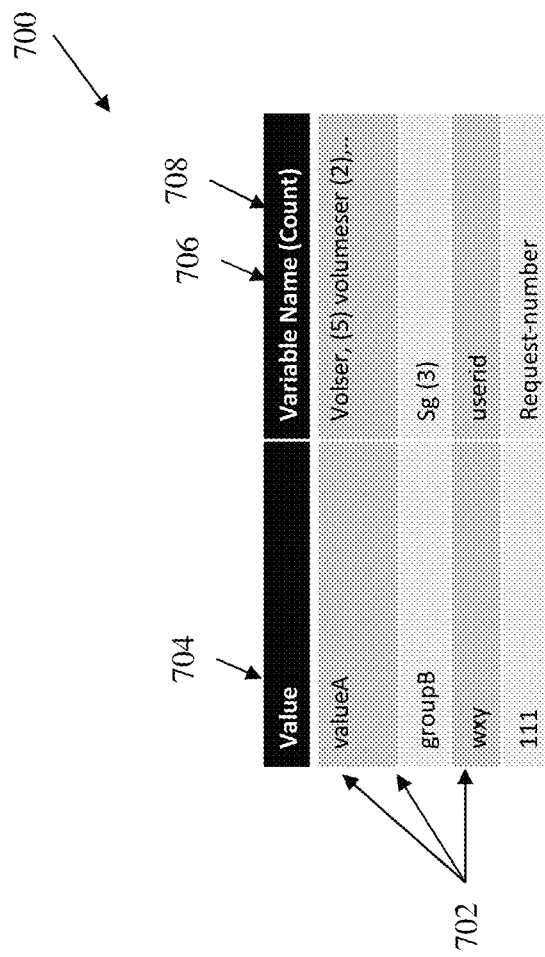
FIG. 7 depicts a variable dictionary according to one or more embodiments of the invention.

Referring now to FIG. 7 a variable dictionary 700 according to one or more embodiments of the invention is shown. As illustrated, the dictionary 700 includes a plurality of entries 702, which each include a value 704 and one or more variable names 706 that are associated with the value 704. In addition, some entries include a counter 708 that is used to indicate the number of times that the value 704 was encountered and annotated with the variable name 706 during processing of the log.

In many cases, the values of a parameter usually share a similar format and naming conventions. As a result, using annotated values from previous logs, a signature vector can be built for a parameter. In exemplary embodiments, signature vectors are created for each parameter and the signature vectors are used to identify a variable name for an unknown variable, rather than require an exact match from the variable dictionary. In one embodiment, a signature vector is created based on an analysis of the string of the values of the parameter.

In one example, the variable Volumename has known values of A01-vol1 and B02-vol2. A signature vector is created by segmenting the value string by a window size, for this example 3. Next, a number of single digits, a number of letters, and a number of other characters in every window of a specific size (e.g., 3) over the string are placed into vectors that are then concatenated. Continuing with the above example, A01 includes 2 digits, 1 letter, and 0 other characters and -vo includes 0 digits, letters, and 1 other character. As a result, the signature vector for the variable Volumename would be [2, 1, 0, 0, 2, 1].

In exemplary embodiments, during the processing of the log when an entry that does not correspond to a log template is encountered, a signature vector for the parameters in the entry is calculated. The calculated signature vector is then compared to the signature vector for the known variable and a similarity, such as a cosine similarity, between the vectors is determined. Based on a determination that the similarity between two signature vectors is larger than a threshold, the parameter is annotated with the variable name.

The variable annotated logs are used as input of template mining process. To compute a template for each of log messages, a prefix tree is built. Compared with traditional prefix tree based template mining, the method presented replaces the tokens in the tree in with their variable names if they have been annotated. When a new token is matched with one or multiple tree nodes representing variables, the similarity between their value signatures is computed and a given threshold is used to decide if the new token matches with a variable node.

Figure 9:
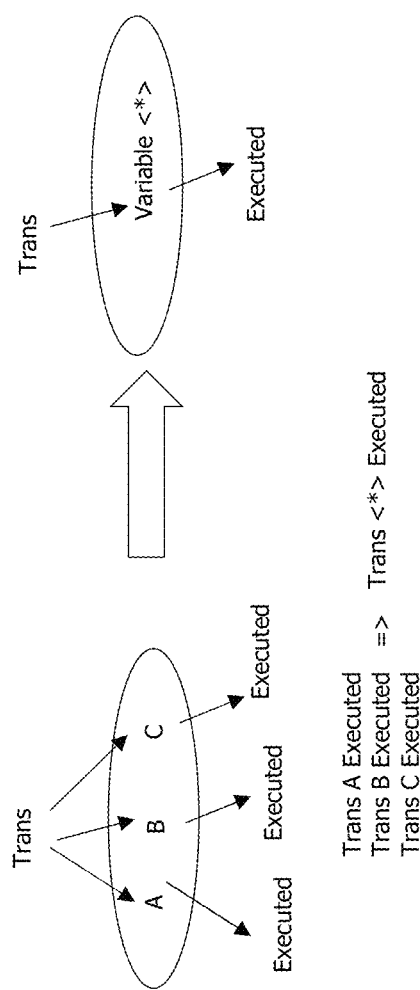
FIG. 9 depicts a method for merging nodes in a prefix tree that have the same node type and keywords according to one or more embodiments of the invention.

Referring now to FIG. 9, after prefix tree is built, a post-processing is further performed on it to identify any redundant subtrees that would lead to the creation of redundant templates. In one embodiment, the post-processing identifies nodes that have greater than a threshold level of child nodes and applies a recurrent algorithm to merge the nodes and their children that have the same node type and keywords. In one embodiment, these nodes are merged into a single node that represents a variable.

Technical benefits of annotating a log based on processing log documentation include creating an annotated log which includes annotation that have a high degree of accuracy. In one embodiment, the annotated logs can be used to perform automated anomaly detection that relies on an analysis of the values and their annotations. In another embodiment, the annotated log is processed to identify and remove sensitive data from the log, such as personally identifiable information that is governed by General Data Protection Regulations (GDPR).

Additional processes may also be included. It should be understood that the processes depicted in FIGS. 6 and 7 represent illustrations and that other processes may be added, or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for annotating a log based on processing log documentation, the method comprising:

obtaining the log having a plurality of entries;

creating a set of log entry templates by processing the log documentation associated with the log, wherein each log entry template includes one or more constants and one or more variables; and annotating each of the plurality of entries based on the set of templates, wherein the annotating includes labeling each value of the one or more variables with a variable name, wherein the log documentation is documentation associated with one or more of pieces of equipment and software that write log messages to log and the log documentation includes an explanation of a structure and a content of log messages created by the one or more of pieces of equipment and software that write log messages to log, wherein the processing of the log documentation includes creating a syntax tree by performing natural language processing and dictionary lookup on the log documentation to identify the one or more constants and the one or more variables that define each log entry template of the set of log entry templates.

2. The computer-implemented method of claim 1, wherein annotating each of the plurality of entries based on the set of templates includes matching each of the plurality of entries with a template from the set of templates based on an anchor based divided-and-conquer tree matching algorithm.

3. The computer-implemented method of claim 1, wherein the method further comprises creating a dictionary including each variable in the log by storing each value of each variable and a number of occurrences of each value in the log.

4. The computer-implemented method of claim 3, further comprising:

identifying an entry of the plurality of entries that does not correspond to any of the set of log entry templates;
looking up each value in the entry in the dictionary; and
annotating each value in the entry with a variable name based on the dictionary lookup.

5. The computer-implemented method of claim 4, wherein the variable name is determined based on identifying the variable name with a highest number of occurrences for the value.

6. The computer-implemented method of claim 3, further comprising:
creating a signature vector for each variable in the dictionary;
identifying an entry of the plurality of entries that do not correspond to any of the set of log entry templates;
creating unknown entry signature vectors for each value in the entry;
based on detecting a match between the signature vector of a first variable in the dictionary and one of the unknown entry signature vectors, annotating the value corresponding to the one of the unknown entry signature vectors with a variable name based on the first variable.

7. The computer-implemented method of claim 6, wherein the signature vector is created by:
obtaining a most frequent value of each variable;
creating a first vector having a number of single digits, a number of letters, and a number of characters in a first window of the string that comprises the frequent value of each variable;
creating a second vector having a number of single digits, a number of letters, and a number of characters in a second window of the string that comprises the frequent value of each variable; and
creating the signature vector by concatenating the first vector and the second vector.

8. The computer-implemented method of claim 1, further comprising processing the set of log entry templates using a prefix tree to identify and merge similar log entry templates into a single log entry template.

9. A system comprising:
a processor communicatively coupled to a memory, the processor configured to:
obtain the log having a plurality of entries;
create a set of log entry templates by processing the log documentation associated with the log, wherein each log entry template includes one or more constants and one or more variables; and
annotate each of the plurality of entries based on the set of templates, wherein the annotating includes labeling each value of the one or more variables with a variable name,
wherein the log documentation is documentation associated with one or more of pieces of equipment and software that write log messages to log and the log documentation includes an explanation of a structure and a content of log messages created by the one or more of pieces of equipment and software that write log messages to log,
wherein the processing of the log documentation includes creating a syntax tree by performing natural language processing and dictionary lookup on the log documentation to identify the one or more constants and the one or more variables that define each log entry template of the set of log entry templates.

10. The system of claim 9, wherein annotating each of the plurality of entries based on the set of templates includes matching each of the plurality of entries with a template from the set of templates based on an anchor based divided-and-conquer tree matching algorithm.

11. The system of claim 9, wherein the processor is further configured to create a dictionary including each variable in the log by storing each value of each variable and a number of occurrences of each value in the log.

12. The system of claim 11, wherein the processor is further configured to:
identify an entry of the plurality of entries that does not correspond to any of the set of log entry templates;
look up each value in the entry in the dictionary; and
annotate each value in the entry with a variable name based on the dictionary lookup.

13. The system of claim 12, wherein the variable name is determined based on identifying the variable name with a highest number of occurrences for the value.

14. The system of claim 12, wherein the processor is further configured to:
create a signature vector for each variable in the dictionary;
identify an entry of the plurality of entries that do not correspond to any of the set of log entry templates;
create unknown entry signature vectors for each value in the entry;
based on detecting a match between the signature vector of a first variable in the dictionary and one of the unknown entry signature vectors, annotate the value corresponding to the one of the unknown entry signature vectors with a variable name based on the first variable.

15. The system of claim 14, wherein the signature vector is created by:
obtaining a most frequent value of each variable;
creating a first vector having a number of single digits, a number of letters, and a number of characters in a first window of the string that comprises the frequent value of each variable;
creating a second vector having a number of single digits, a number of letters, and a number of characters in a second window of the string that comprises the frequent value of each variable; and
creating the signature vector by concatenating the first vector and the second vector.

16. A computer program product for annotating a log based on processing log documentation comprising a computer readable storage medium having program instructions embodied therewith, the program instructions executable by a processor to cause the processor to perform a method comprising:
obtaining the log having a plurality of entries;
creating a set of log entry templates by processing the log documentation associated with the log, wherein each log entry template includes one or more constants and one or more variables; and
annotating each of the plurality of entries based on the set of templates, wherein the annotating includes labeling each value of the one or more variables with a variable name,
wherein the log documentation is documentation associated with one or more of pieces of equipment and software that write log messages to log and the log documentation includes an explanation of a structure and a content of log messages created by the one or more of pieces of equipment and software that write log messages to log, wherein the processing of the log documentation includes creating a syntax tree by performing natural language processing and dictionary lookup on the log documentation to identify the one or more constants and the one or more variables that define each log entry template of the set of log entry templates.

17. The computer program product of claim 15, wherein the method further comprises creating a dictionary including each variable in the log by storing each value of each variable and a number of occurrences of each value in the log.

\* \* \* \* \*